United States Patent
Tóth et al.

(10) Patent No.: US 7,138,757 B2
(45) Date of Patent: Nov. 21, 2006

(54) HIGH LUMEN OUTPUT FLUORESCENT LAMP WITH HIGH COLOR RENDITION

(75) Inventors: Katalin Tóth, Viola (HU); Ottokár Gyulasi, Dobozi (HU); Colin Catherall, Enfield (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/966,436

(22) Filed: Oct. 15, 2004

(65) Prior Publication Data

US 2005/0236959 A1  Oct. 27, 2005

(30) Foreign Application Priority Data

Nov. 19, 2003 (GB) ................................. 0326960.2

(51) Int. Cl.
*H01J 63/04* (2006.01)
(52) U.S. Cl. .............................. 313/486; 252/301.4 R; 252/301.6 P; 252/301.4 P
(58) Field of Classification Search ......... 252/301.4 R, 252/301.6 P, 301.4 P; 313/486, 487
See application file for complete search history.

(56) References Cited

U.S. PATENT DOCUMENTS

| | | | | |
|---|---|---|---|---|
| 6,137,217 A | * | 10/2000 | Pappalardo et al. | 313/487 |
| 6,452,324 B1 | * | 9/2002 | Soules et al. | 313/486 |
| 6,525,460 B1 | * | 2/2003 | Soules et al. | 313/487 |
| 6,794,810 B1 | * | 9/2004 | Gruber et al. | 313/487 |

OTHER PUBLICATIONS

Library of Congress Cataloging-in-Publication Data. Shigeo Shionoya, William M. Yen; members Takashi Hase et al, Phosphor Handbook, CRC Press, Washington D.C., p. 170 , 1987.* http://www.Sylvania.com/BusinessProducts/MaterialsandComponents/Lighting, "Fluorescent Lamps, Fluorescent Lamp & Neon Phosphors," Jan. 4, 2006.
http://www.Sylvania.com/BusinessProducts/MaterialsandComponents/Lighting, Fluorescent Blends, Phosphors for Fluorescent Blends, Jan. 4, 2006.

* cited by examiner

Primary Examiner—Joseph Williams
Assistant Examiner—Hana A. Sanei
(74) *Attorney, Agent, or Firm*—Fay, Sharpe, Fagan, Minnich & McKee, LLP

(57) ABSTRACT

A high lumen output compact fluorescent lamp is disclosed that has a luminous efficiency of 40 lumen/W or higher. The fluorescent lamp comprises an envelope enclosing a discharge space, means for providing a discharge in the discharge space, a discharge gas sealed in the discharge space and a fluorescent layer made of a phosphor blend coated on the inner surface of the envelope. The phosphor blend comprises a, 55 to 80 weight % of a first phosphor having an emission band with a maximum between 620 nm and 635 nm and having a half-value width of 70 nm to 150 nm, b, 5 to 30 weight % of a second phosphor having an emission band with a maximum between 605 nm and 615 nm and having a half-value width of 1 nm to 10 nm, c, 0 to 20 weight % of a third phosphor having an emission band with a maximum between 540 nm and 550 nm and having a half-value width of 1 nm to 10 nm, and d, 0 to 30 weight % of a fourth phosphor having an emission band with a maximum between 480 nm and 500 nm and having a half-value width of 50 nm to 80 nm. The lamp havs an $R_a$ value greater than 90 and a photographic color temperature between 3000 K and 3500 K.

A lamp is also disclosed in which the phosphor blend comprises: a, 20 to 60 weight % of a first phosphor having an emission band with a maximum between 620 nm and 635 nm and having a half-value width of 70 nm to 150 nm, b, 20 to 65 weight % of a second phosphor having an emission band with a maximum between 480 nm and 500 nm and having a half-value width of 50 nm to 95 nm, c, 0 to 20 weight % of a third phosphor having an emission band with a maximum between 450 nm and 460 nm and having a half-value width of 40 nm to 65 nm and d, 0 to 30 weight % of a fourth phosphor having an emission band with a maximum between 610 nm and 630 nm and having a half-value width of 1 nm to 10 nm. This lamp has an $R_a$ value greater than 90 and a photographic color temperature between 5000 K and 6000 K.

25 Claims, 4 Drawing Sheets

HIGH LUMEN OUTPUT FLUORESCENT LAMP WITH HIGH COLOR RENDITION

BACKGROUND OF THE INVENTION

The invention relates to high lumen output fluorescent discharge lamp having high color rendering.

The color rendering ability of a light source is measured with the color rendering index CRI. CRI measures difference between appearance of test colors under artificial light (where the artificial light is emitted by the light source to be measured) and the appearance of the same test colors when seen by light from a blackbody source having the same color temperature as the tested light source. The method to measure the color rendering index is disclosed in "Method of Measuring and Specifying Colour Rendering Properties of Light Sources, 2nd Edition", International Commission on Illumination, Publication CIE No. 13.2 (TC-3.2) 1974, the contents of which are hereby incorporated by reference. The differences in value, chroma and hue of the light reflected under the light source to be measured and the light source are obtained and summed, the square root of the sum is taken, multiplied by a constant, and subtracted from 100. This calculation is performed for 14 different color standards. The color rendering index for each of these standards is designated Ri, where i=1, . . . , 14. The General Color Rendering Index, Ra, is defined as the average of the first eight indices, R1–R8. The constant has been chosen such that Ra for a standard warm white fluorescent tube is approximately 50. For better illustration, an Ra value of 100 corresponds to a "perfect" light source, i.e. under which a color sample appears exactly as it would appear when illuminated by a "standard" light source, such as an incandescent (black body) lamp or natural daylight, which are perceived as the most "natural" light conditions.

From the above it follows that another factor, the correlated color temperature should be also considered, when assessing the color rendition of a lamp. The correlated color temperature (CCT) value of a light source is defined as the temperature of a black body radiator which would appear to have the same color as the light source in question. The unit of measurement is in Kelvin (K) which determines the warm or cool appearance of a light source. The lower the color temperature, the warmer or more yellow is the appearance. The higher the color temperature, the cooler or bluer is the appearance. Typical color temperatures are 2800K for incandescent, 3000K for halogen, 4200K for cool white, and 5000K for metal halide and daylight fluorescent lamps. Generally, fluorescent lamps with a CCT value of 3200K are used to "imitate" an incandescent light source, while lamps with a CCT value of approx. 5500K are supposed to provide the same or similar illumination as natural daylight.

A similar measure of a lamp is used by photo professionals. This is termed as photographic color temperature, and it takes into consideration the sensitivity curves of various films. The values of the photographic color temperature may be quite different from the CCT value, due to the differences in the method of measurement. Accordingly, it is more appropriate to characterize lamps with their photographic color temperature, instead of the CCT, if these are destined for use in photography or cinematography. Photographic color temperature is measured by specialized color meters, where e.g. the meters marketed by Minolta Corp, Japan are considered as virtual standards.

There are certain applications where good color rendition is very important. Such applications are illumination in commercial units, where the true color perception of products are desired, such as clothing stores, fresh food stores. Another important application is photo and cinema studios, which normally need very intensive illumination. Further, traditional light sources in cinema studios generate so much heat that extra cooling of the rooms may be needed. Therefore, these latter applications need light sources that have not only good color rendition, but are also energy efficient.

Various attempts were made to make fluorescent light sources with improved color rendering properties. It is normally sought to improve or modify the color rendering properties by blending different types of phosphors. For example, U.S. Pat. No. 5,028,839 and U.S. Pat. No. 5,539,276 disclose fluorescent lamps, primarily for use in aquaria, which have a fluorescent layer composed of various phosphors, having different emission peaks and half-width values.

U.S. Pat. No. 6,525,460 discloses fluorescent lamp in the form of a light tube having very high color rendition properties. This known lamp comprises a phosphor-containing layer made of a blend of various phosphors. The lamp has an Ra value greater than 96 and a CCT between 2700K and 6600K. Specifically, the lamp provides very high R values for the colors Saturated Red, Saturated Yellow, Flesh Tone and Vegetable Green. However, in order to obtain these parameters, the phosphor layer of the lamp disclosed in U.S. Pat. No. 6,525,460 also comprises a filter, which is effective in the 400–450 nm range. This filter has a negative effect on the efficiency of the lamp, and also adds difficulty to the manufacturing process of the lamp, because the proportion of an additional component must be controlled.

Recently, there is a trend towards smaller form factors in the fluorescent lamp market, and it is desired to achieve the same or better lighting performance with compact fluorescent lamps which could be traditionally achieved only with relatively large light tubes. However, if the same light output is to be produced in a smaller discharge vessel, it will inevitably increase the wall load, i.e. the amount of energy falling on a unit area of the phosphor. For example, if a traditional light tube with a diameter of 38 mm is to be replaced by a compact fluorescent lamp with a diameter of approx. 15 mm, such as a lamp for a 2G11 socket, the wall load will be approx. fourfold. This means that the phosphor will be subjected to a much higher load, and certain components of the phosphor will tend to deteriorate, due to oxidization or other processes. As a result, a general degradation of the luminous parameters of the lamp will be observed. For example, the phosphor $(Sr,Mg,Ca)_3(PO_4)_2:Sn^{2+}$ used in the phosphor blend of the lamp disclosed in U.S. Pat. No. 6,525,460 exhibits a marked degradation tendency with increasing lumen output. These effects will be even more significant at the bends of the discharge tube.

Therefore, it is an imperative to use phosphor blends that have high conversion efficiency, so that a high lumen output can be achieved with relatively low power consumption, thereby also reducing the load on the phosphor. Since the conversion efficiency of a phosphor is difficult to measure, it is usual to measure the luminous efficiency of fluorescent lamps (also termed as efficacy). Efficacy is the industry term for the amount of light produced per watt of electricity, and therefore it is quite comparable to efficiency. Efficacy is the rate at which a light bulb is able to convert electrical power (watts) into light (lumens), expressed in terms of lumens per watt (LPW). The efficacy of the lamp depends on a number of factors beside the conversion efficiency of the phosphor, but for similar discharge configurations and similar discharge volume geometries, the differences in the efficacy will be primarily determined by the conversion efficiency of the phosphor.

Therefore, there is a need for a fluorescent lamp having a stable phosphor composition, which provides at the same time outstanding color rendering, preferably at different color temperatures, combined with high luminous efficiency. Also, there is a need for a fluorescent lamp which contains only a few phosphors in its phosphor composition, and thus may be produced with relative ease.

SUMMARY OF THE INVENTION

In an exemplary embodiment of the present invention, there is provided a high lumen output compact fluorescent lamp with a luminous efficiency of 40 lumen/W or higher. The lamp comprises an envelope enclosing a discharge space, and means for providing a discharge in the discharge space. A discharge gas is sealed in the discharge space. Further, the lamp has a fluorescent layer made of a phosphor blend coated on the inner surface of the envelope. The phosphor blend comprises 55 to 80 weight % of a first phosphor having an emission band with a maximum between 620 nm and 635 nm and having a half-value width of 70 nm to 150 nm, 5 to 30 weight % of a second phosphor having an emission band with a maximum between 605 nm and 615 nm and having a half-value width of 1 nm to 10 nm, 0 to 20 weight % of a third phosphor having an emission band with a maximum between 540 nm and 550 nm and having a half-value width of 1 nm to 10 nm, 0 to 30 weight % of a fourth phosphor having an emission band with a maximum between 480 nm and 500 nm and having a half-value width of 50 nm to 80 nm. The lamp has an $R_a$ value greater than 90 and a photographic color temperature between 3000K and 3500K.

In another exemplary embodiment of the present invention, there is provided a high lumen output compact fluorescent lamp with a luminous efficiency of 40 lumen/W or higher. The lamp comprises an envelope enclosing a discharge space, and means for providing a discharge in the discharge space. A discharge gas is sealed in the discharge space. Further, the lamp has a fluorescent layer made of a phosphor blend coated on the inner surface of the envelope. 20 to 60 weight % of a first phosphor having an emission band with a maximum between 620 nm and 635 nm and having a half-value width of 70 nm to 150 nm, 20 to 65 weight % of a second phosphor having an emission band with a maximum between 480 nm and 500 nm and having a half-value width of 50 nm to 95 nm, 0 to 20 weight % of a third phosphor having an emission band with a maximum between 450 nm and 460 nm and having a half-value width of 40 nm to 65 nm, 0 to 30 weight % of a fourth phosphor having an emission band with a maximum between 610 nm and 630 nm and having a half-value width of 1 nm to 10 nm, said lamp having an $R_a$ value greater than 90 and a photographic color temperature between 5000K and 6000K.

The disclosed lamp is capable of reaching an $R_a$ of 90 for at a photographic color temperature of 3200K, and an $R_a$ of 94 at a photographic color temperature of 5500K. The luminous efficiency of the lamp may reach 48 lumen/W at a photographic color temperature of 3200K, and 43 lumen/W at a photographic color temperature of 5500K.

BRIEF DESCRIPTION OF DRAWINGS

The invention will be now described with reference to the enclosed drawings, where.

DETAILED DESCRIPTION OF THE INVENTION

Figure 1:
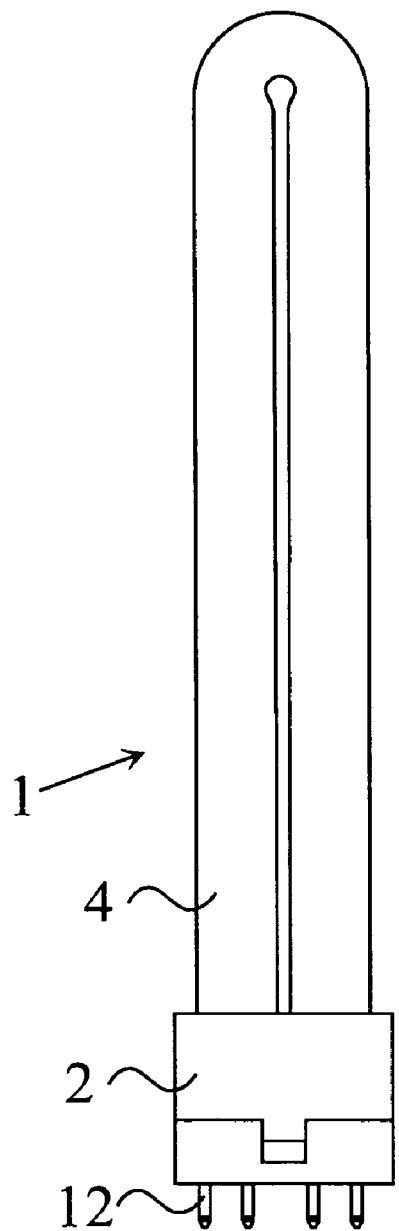
FIGS. 1–2 are two side views of an embodiment of a compact fluorescent lamp.
Figure 2:
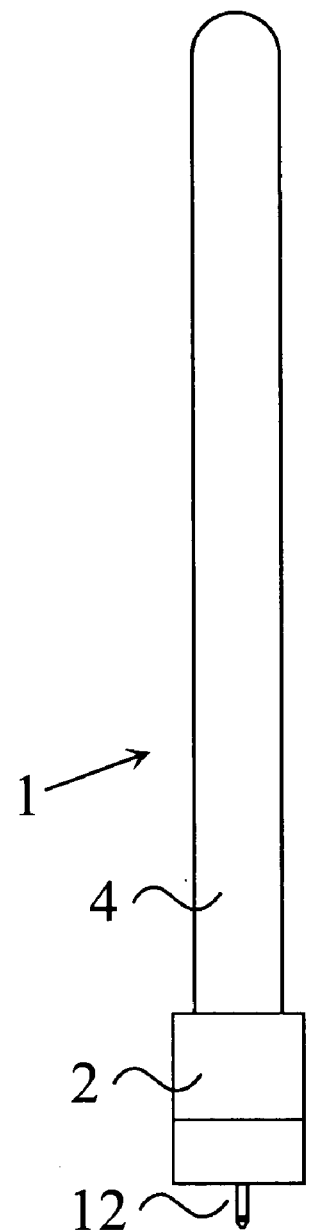
Figure 3:
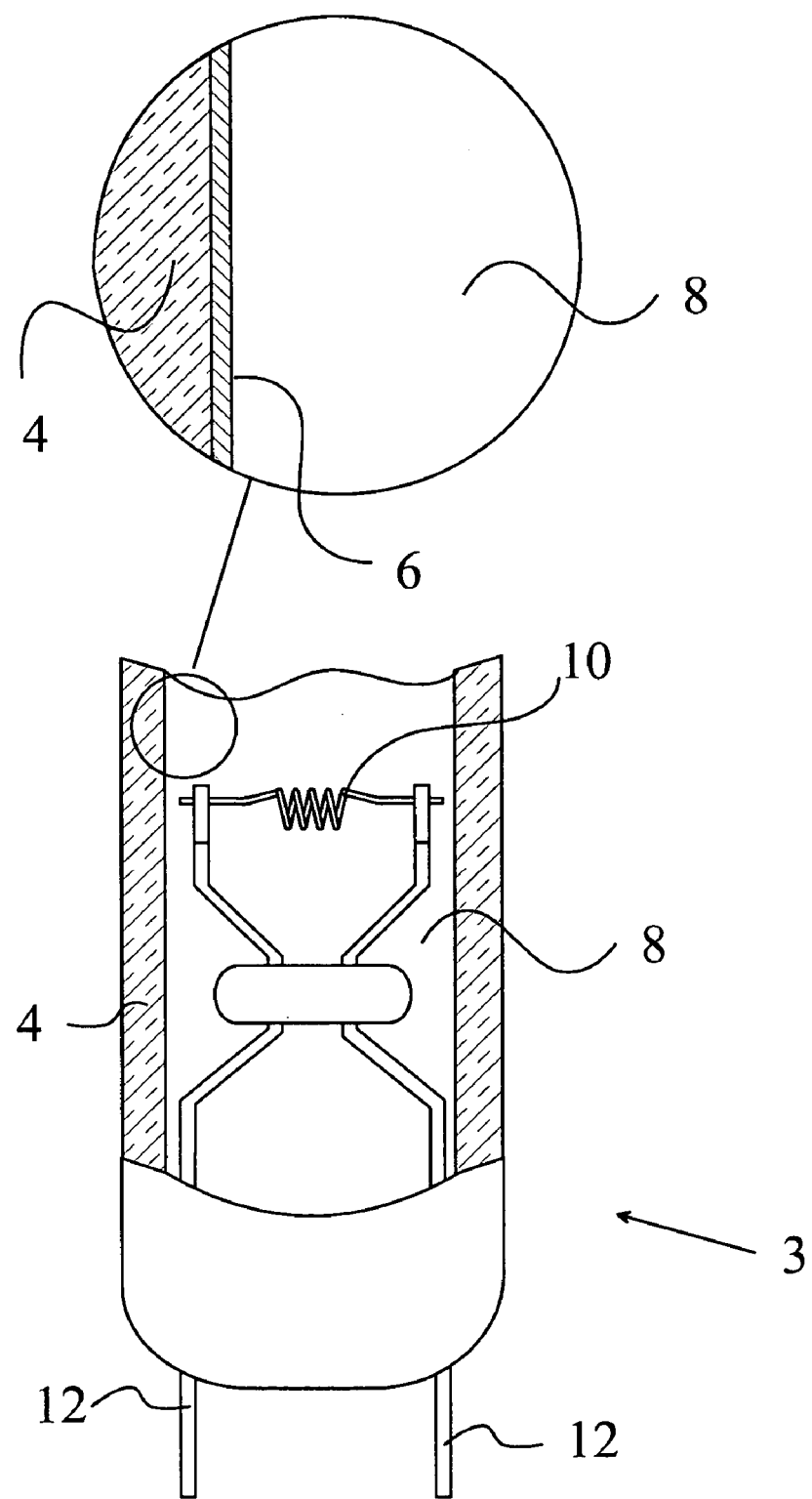
FIG. 3 is an end portion of the envelope of the lamp of FIGS. 1 and 2, in partial cross section.

Referring now to FIGS. 1 to 3, there is shown a compact fluorescent lamp in the form of a high lumen biaxial lamp. The lamp 1 is equipped with a lamp base 2 and a translucent envelope 4. The envelope 4 hermetically seals a discharge space 8, so the envelope 4 functions as a discharge vessel. The envelope 4 is typically made of glass. The inner surface of the envelope 4 is covered by a phosphor layer 6. At both end parts 3 of the lamp 1 (partly covered by the lamp base 2 in FIGS. 1 and 2), a pair of filaments 10 act as the means for providing a discharge in the discharge space 8. The filaments 10 are connected to the electric contacts 12 of the lamp base 2. The discharge space 8 comprises a discharge gas, which is normally an inert gas, such as argon. The discharge gas usually also contains mercury as the source of the UV-radiation, which latter is used for exciting the phosphor layer. The mercury itself is excited by an electric discharge current in the discharge space 8. This structure of such a compact fluorescent lamp 1 is known itself. In the shown embodiment, the lamp base 2 is formed as a male plug fitting into a standard 2G11 female socket (not shown). Such a socket may also include a ballast circuit, also in a known manner.

The phosphor layer 6 coated on the inner surface of the envelope 4 may be composed of various phosphors, depending on the desired parameters. Exemplary phosphors are shown in Table 1. The emission properties of these phosphors are shown in Table II. The phosphor names are indicated in the form used in commerce and professional literature.

TABLE I

| Phosphors | Name | Composition |
|---|---|---|
| YEO | Yttrium Oxide:Eu | $Y_2O_3$:Eu |
| SrRed | Strontium Magnesium Phosphate: Tin | $(Sr,Mg)_3(PO4)_2$:Sn |
| LAP | Cerium Lanthanium Phosphate: Tb | $LaPO_4$:Ce,Tb |
| SAE | Strontium Aluminate:Eu | $Sr_3AL_{14}O_{25}$:Sn |
| CBM | Gadolinium Zinc Magnesium Pentaborate: Ce, Mn | $Gd(Zn,Mg)B_5O_{10}$:Ce,Mn |
| BAMMn | Barium Magnesium (Manganese) Aluminate | $(Ba,Sr,Eu)(Mg,Mn)Al_{10}O_{17}$ |
| BECA | Barium Calcium Chloro Phosphate: Eu | $(BaCa)_5(PO_4)_3Cl$:Eu |

TABLE II

| Phosphors | Composition | maximum of emission band | half-value width |
|---|---|---|---|
| YEO | $Y_2O_3$:Eu | 611 nm | 2 nm |
| SrRed | $(Sr,Mg)_3(PO_4)_2$:Sn | 622 nm | 137 nm |
| LAP | $LaPO_4$:Ce,Tb | 544 nm | 5 nm |
| SAE | $Sr_3AL_{14}O_{25}$:Sn | 490 nm | 64 nm |
| CBM | $Gd(Zn,Mg)B_5O_{10}$:Ce,Mn | 630 nm | 75 nm |
| BAMMn | $(Ba,Sr,Eu)(Mg,Mn)Al_{10}O_{17}$ | 455 nm | 53 nm |
| BECA | $(BaCa)_5(PO_4)_3Cl$:Eu | 487 nm | 89 nm |

Typically, photographic and cinema applications not only require intensive illumination, but also that the colors of persons and objects are reproduced in with true colors on the photograph or film. Professionals normally demand light sources having a photographic color temperature between 2700 and 6000K, standard values for commercially available lamps being 3200K and 5500 K. The photographic color temperature is determined typically by a specialized device. Therefore, the following examples show two 3200K lamps and two 5500K lamps, all having a nominal power of 55 W, with photographic color temperatures measured by a Minolta Color Meter IIIf instrument, available from Minolta Corp., Japan.

In order to obtain a lamp having between 2700K and 3500K, preferably 3200K photographic color temperature, it was found that a phosphor blend with the following composition provided parameters superior to known lamps (weight percentages are based on total weight of the phosphors):

a, 55 to 80 weight % of a first phosphor having an emission band with a maximum between 620 nm and 635 nm and having a half-value width of 70 nm to 150 nm, b, 5 to 30 weight % of a second phosphor having an emission band with a maximum between 605 nm and 615 nm and having a half-value width of 1 nm to 10 nm, c, 0 to 20 weight % of a third phosphor having an emission band with a maximum between 540 nm and 550 nm and having a half-value width of 1 nm to 10 nm, d, 0 to 30 weight % of a fourth phosphor having an emission band with a maximum between 480 nm and 500 nm and having a half-value width of 50 nm to 80 nm.

Preferably, the first phosphor may be either $(Sr,Mg)_3(PO_4)_2$:Sn or $Gd(Zn,Mg)B_5O_{10}$:Ce,Mn.

In the event that the first phosphor is $(Sr,Mg)_3(PO_4)_2$:Sn, the suggested amount is 55 to 65 weight %. In that case, the proposed second phosphor may be $Y_2O_3$:Eu, which may be present in an amount of 16 to 26 weight %.

If the first phosphor is $(Sr,Mg)_3(PO_4)_2$:Sn, the third phosphor is $LaPO_4$:Ce,Tb in a possible embodiment, which is present in an amount of 2 to 10 weight %.

In the event that the first phosphor is $(Sr,Mg)_3(PO_4)_2$:Sn, the fourth phosphor is $Sr_3AL_{14}O_{25}$:Sn in a further possible embodiment, which is present in an amount of 5 to 25 weight %.

More preferably, the first phosphor in the phosphor blend is present in an amount of 55 to 65 weight % and is $(Sr,Mg)_3(PO_4)_2$:Sn, while the second phosphor is present in an amount of 16 to 26 weight % and is $Y_2O_3$:Eu. The third phosphor is present in an amount of 2 to 10 weight % and is $LaPO_4$:Ce,Tb, while the fourth phosphor is present in an amount of 5 to 25 weight % and is $Sr_3AL_{14}O_{25}$:Sn.

In the event that the first phosphor is $Gd(Zn,Mg)B_5O_{10}$:Ce,Mn, the suggested amount is 65 to 77 weight %.

In the event that the first phosphor is $Gd(Zn,Mg)B_5O_{10}$:Ce,Mn, it is preferred-if the second phosphor is present in an amount of 5 to 15 weight % and is $Y_2O_3$:Eu. In the event that the first phosphor is $Gd(Zn,Mg)B_5O_{10}$:Ce,Mn, the third phosphor may be $LaPO_4$:Ce,Tb, which may be present in an amount of 7 to 17 weight %.

In the event that the first phosphor is $Gd(Zn,Mg)B_5O_{10}$:Ce,Mn, the fourth phosphor is advantageously $Sr_3AL_{14}O_{25}$:Sn, which may be present in an amount of 1 to 12 weight %.

In another preferred composition of the phosphor blend, the first phosphor is present in an amount of 65 to 77 weight % and is $Gd(Zn,Mg)B_5O_{10}$:Ce,Mn, while the second phosphor is present in an amount of 5 to 15 weight % and is $Y_2O_3$:Eu. In this case, preferably the third phosphor is present in an amount of 7 to 17 weight % and is $LaPO_4$:Ce,Tb, while the fourth phosphor is present in an amount of 1 to 12 weight % and is $Sr_3AL_{14}O_{25}$:Sn.

With other words, a lamp could be manufactured with a phosphor comprising only four components, and providing an $R_a$ value greater than 90. Two examples of this lamp are disclosed in detail below.

EXAMPLE 1

A number of lamps were produced of the phosphors YEO, SrRed, LAP, SAE with the following phosphor compositions:

| Phosphor | Phosphor weight composition in % | |
|---|---|---|
| | range | Example 1 |
| YEO | 16–26 | 20,8 |
| SrRed | 55–65 | 56,8 |
| LAP | 2–10 | 3 |
| SAE | 5–25 | 19,4 |

Figure 4:
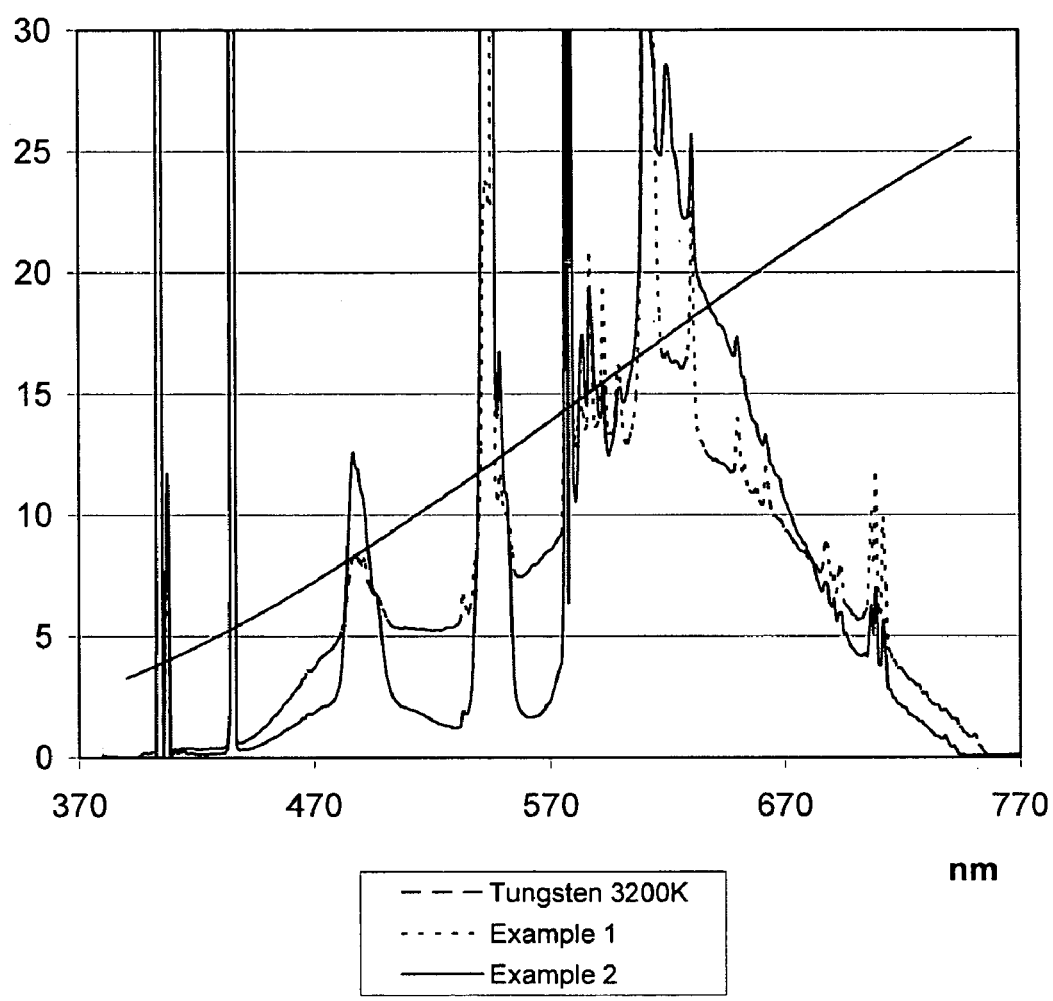
FIG. 4 shows the spectra of two embodiments of a compact fluorescent lamp having a CCT of 3200K, compared with the spectrum of an incandescent tungsten light source.

A lamp with a phosphor blend having an exemplary composition is indicated as "Example 1" from the lamps falling into the shown ranges of phosphor compositions. The spectrum of this lamp is shown in FIG. 4. The lamp has a photographic color temperature of 3200K. Luminous efficiency value is above 48 lumen/W, while CRI index $R_a$ is 91.

EXAMPLE 2

Further lamps were produced of the phosphors YEO, LAP, SAE and CBM, with the following phosphor compositions:

| Phosphor | Phosphor weight composition in % | |
|---|---|---|
| | range | Example 2 |
| YEO | 5–15 | 9 |
| LAP | 7–17 | 10,4 |
| SAE | 1–12 | 9,7 |
| CBM | 65–77 | 70,9 |

A lamp with a phosphor blend having an exemplary composition is indicated as "Example 2" from the lamps falling into the shown ranges of phosphor compositions. The spectrum of this lamp is shown in FIG. 4. The lamp has a photographic color temperature of 3200K. Luminous efficiency value is above 40 lumen/W, while CRI index $R_a$ is 89.

In order to obtain a lamp having between 5000K and 6000K, preferably 5500K photographic color temperature, it was found that a phosphor blend with the following composition provided parameters superior to known lamps:

a, 20 to 60 weight % of a first phosphor having an emission band with a maximum between 620 nm and 635 nm and having a half-value width of 70 nm to 150 nm, b, 20 to 65 weight % of a second phosphor having an emission band with a maximum between 480 nm and 500 nm and having a half-value width of 50 nm to 95 nm, c, 0 to 20 weight % of a third phosphor having an emission band with a maximum between 450 nm and 460 nm and having a half-value width of 40 nm to 65 nm d, 0 to 30 weight % of a fourth phosphor having an emission band with a maximum between 610 nm and 630 nm and having a half-value width of 1 nm to 10 nm.

This means that a lamp could be manufactured with a phosphor comprising only four components, and providing a lamp with an $R_a$ value greater than 90 and a photographic color temperature between 5000K and 6000K. Actually, as the examples below will show, it is even possible to manufacture a lamp with only three phosphor components, and still obtain outstanding color rendering and efficacy.

It has been found that for the manufacturing of lamps with a photographic color temperature between 5000K and 6000K, the first phosphor preferably is either $(Sr,Mg)_3(PO_4)_2$:Sn or $Gd(Zn,Mg)B_5O_{10}$:Ce,Mn.

In the event that the first phosphor is $(Sr,Mg)_3(PO_4)_2$:Sn, it may be present in an amount of 50 to 60 weight %.

If the first phosphor is $(Sr,Mg)_3(PO_4)_2$:Sn, it is preferred to use $Sr_3AL_{14}O_{25}$:Sn as the second phosphor, which may be present in an amount of 20 to 30 weight %.

In the event that the first phosphor is $(Sr,Mg)_3(PO_4)_2$:Sn, the third phosphor is preferably $(Ba,Sr,Eu)(Mg,Mn)Al_{10}O_{17}$, which may be present in an amount of 10 to 30 weight %.

More preferably a lamp with a photographic color temperature may have a phosphor blend comprising $(Sr,Mg)_3(PO_4)_2$:Sn as the first phosphor, which is present in an amount of 50 to 60 weight %, further comprising $Sr_3AL_{14}O_{25}$:Sn as the said second phosphor, which is present in an amount of 20 to 30 weight %, and further comprising $(Ba,Sr,Eu)(Mg,Mn)Al_{10}O_{17}$ as the third phosphor, which is present in an amount of 10 to 30 weight %. A fourth phosphor is not necessary in the phosphor blend, it may be omitted.

Such a lamp is capable of providing an $R_a$ value greater than 96 at a photographic color temperature of 5500K.

In an alternative embodiment of a lamp having a photographic color temperature of between 5000K and 6000K, the first phosphor is $Gd(Zn,Mg)B_5O_{10}$:Ce,Mn, which may be present in an amount of 20 to 50 weight %.

In the event that the first phosphor is $Gd(Zn,Mg)B_5O_{10}$:Ce,Mn, it is preferred if the second phosphor is $(BaCa)_5(PO_4)_3Cl$:Eu, which is present in an amount of 50 to 65 weight %.

In the event that the first phosphor is $Gd(Zn,Mg)B_5O_{10}$:Ce,Mn, it is preferred if a further phosphor is $(Sr,Mg)_3(PO_4)_2$:Sn, which may be present in an amount of 1 to 15 weight %.

More preferably, a lamp with a photographic color temperature of 5500 K comprises $Gd(Zn,Mg)B_5O_{10}$:Ce,Mn as a first phosphor, which is present in an amount of 20 to 50 weight %, and further comprises $(BaCa)_5(PO_4)_3Cl$:Eu as a second phosphor, which is present in an amount of 50 to 65 weight %, and further comprises $(Sr,Mg)_3(PO_4)_2$:Sn as a further phosphor, which is present in an amount of 1 to 15 weight %. No further phosphor is needed.

EXAMPLE 3

Lamps were produced of the phosphors SrRed, SAE and BAMMn, with the following phosphor compositions:

| Phosphor | Phosphor weight composition in % | |
|---|---|---|
| | range | Example 3 |
| SrRed | 50–60 | 55,4 |
| SAE | 20–30 | 24,8 |
| BAMMn | 10–30 | 19,8 |

Figure 5:
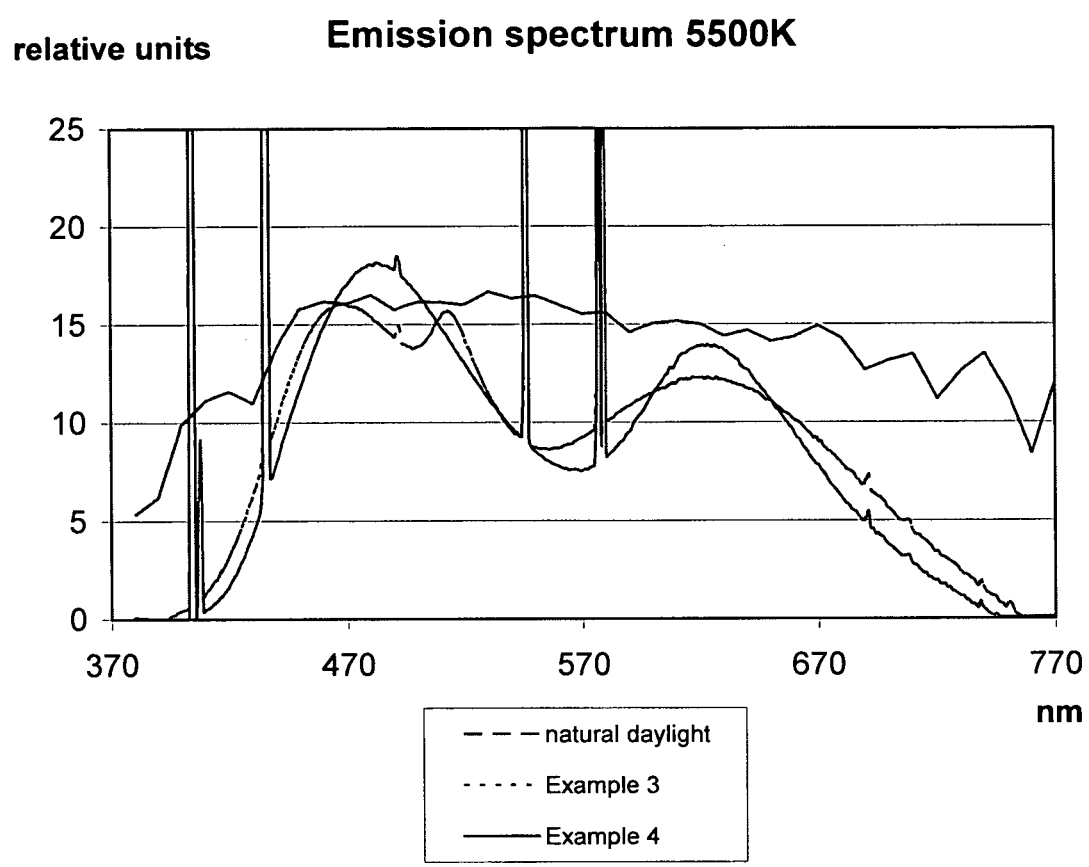
FIG. 5 shows the spectra of two embodiments of a compact fluorescent lamp having a CCT of 5500K, compared with the spectrum of natural daylight.

A lamp with a phosphor blend having an exemplary composition is indicated as "Example 3" from the lamps falling into the shown ranges of phosphor compositions. The spectrum of this lamp is shown in FIG. 5. The lamp has a photographic color temperature of 5500K. Luminous efficiency value is above 43 lumen/W, while CRI index $R_a$ is 96.

EXAMPLE 4

Further lamps were produced of the phosphors SrRed, CBM, BECA with the following phosphor compositions:

| Phosphor | Phosphor weight composition in % | |
|---|---|---|
| | ranges | Example 4 |
| SrRed | 1–15 | 6,9 |
| CBM | 20–50 | 35,6 |
| BECA | 50–65 | 57,5 |

A lamp with a phosphor blend having an exemplary composition is indicated as "Example 4" from the lamps falling into the shown ranges of phosphor compositions. The spectrum of this lamp is shown in FIG. 5. The lamp has a photographic color temperature of 5500K. Luminous efficiency value is above 40 lumen/W, while CRI index $R_a$ is 94.

The invention is not limited to the shown and disclosed embodiments, but other elements, improvements and variations are also within the scope of the invention. For example, it is clear for those skilled in the art that the proposed phosphor composition is applicable not only with the biax lamp configuration shown in FIGS. 1 and 2, but also with other compact fluorescent lamps, for example a circular lamp or straight two-ended lamp. Also, the disclosed phosphor compositions are suitable for producing lamps having different photographic color temperatures.

The invention claimed is:

1. A high lumen output compact fluorescent lamp having a luminous efficiency of 40 lumen/W or higher, comprising
an envelope enclosing a discharge space,
means for providing a discharge in the discharge space,
a discharge gas sealed in the discharge space,
a fluorescent layer made of a phosphor blend coated on the inner surface of said envelope, the phosphor blend comprising
55 to 65 weight % of a first phosphor which is $(Sr,Mg)_3(PO_4)_2$:Sn having an emission band with a maximum between 620 nm and 635 nm and having a half-value width of 70 nm to 150 nm,
5 to 30 weight % of a second phosphor having an emission band with a maximum between 605 nm and 615 nm and having a half-value width of 1 nm to 10 nm,
2 to 10 weight % of a third phosphor which is $LaPO_4$:Ce,Tb having an emission band with a maximum between 540 nm and 550 nm and having a half-value width of 1 nm to 10 nm,
0 to 30 weight % of a fourth phosphor having an emission band with a maximum between 480 nm and 500 nm and having a half-value width of 50 nm to 80 nm,
said lamp having an $R_a$ value greater than 90 and a photographic color temperature between 3000K and 3500K.

2. A lamp according to claim 1, wherein said second phosphor is present in an amount of 16 to 26 weight % and is $Y_2O_3$:Eu.

3. A lamp according to claim 1, wherein said second phosphor is present in an amount of 5 to 15 weight % and is $Y_2O_3$:Eu.

4. A lamp according to claim 1, wherein said fourth phosphor is present in an amount of 5 to 25 weight % and is $Sr_3AL_{14}O_{25}$:Sn.

5. A lamp according to claim 1 wherein said fourth phosphor is present in an amount of 1 to 12 weight % and is $Sr_3AL_{14}O_{25}$:Sn.

6. A lamp according to claim 1, wherein the discharge space contains mercury.

7. A lamp according to claim 1, said lamp having an $R_a$ value greater than 90.

8. A lamp according to claim 1, said lamp having an $R_a$ value greater than 90 and a photographic color temperature of 3200K.

9. A lamp according to claim 1, wherein said first phosphor is present in an amount of 55 to 65 weight % and is $(Sr,Mg)_3(PO_4)_2$:Sn, said second phosphor is present in an amount of 16 to 26 weight % and is $Y_2O_3$:Eu, said third phosphor is present in an amount of 2 to 10 weight % and is $LaPO_4$:Ce,Tb, said fourth phosphor is present in an amount of 5 to 25 weight % and is $Sr_3AL_{14}O_{25}$:Sn.

10. A high lumen output compact fluorescent lamp having a luminous efficiency of 40 lumen/W or higher, comprising
an envelope enclosing a discharge space,
means for providing a discharge in the discharge space,
a discharge gas sealed in the discharge space,
a fluorescent layer made of a phosphor blend coated on the inner surface of said envelope, the phosphor blend comprising a first phosphor, a second phosphor, a third phosphor, and a fourth phosphor:
wherein said first phosphor is present in an amount of 65 to 77 weight % and is $Gd(Zn,Mg)B_5O_{10}$:Ce,Mn, said second phosphor is present in an amount of S to 15 weight % and is $Y_2O_3$:Eu, said third phosphor is present in an amount of 7 to 17 weight % and is $LaPO_4$:Ce,Tb, said fourth phosphor is present in an amount of I to 12 weight % and is $Sr_3AL_{14}O_{25}$:Sn; and
said lamp having an $R_a$ value greater than 89 and a photographic color temperature between 3000K and 3500K.

11. A high lumen output compact fluorescent lamp having a luminous efficiency of 40 lumen/W or higher, comprising
an envelope enclosing a discharge space,
means for providing a discharge in the discharge space,
a discharge gas sealed in the discharge space,
a fluorescent layer made of a phosphor blend coated on the inner surface of said envelope, the phosphor blend comprising 20 to 60 weight % of a first phosphor having an emission band with a maximum between 620 nm and 635 nm and having a half-value width of 70 nm to 150 nm, 20 to 65 weight % of a second phosphor having an emission band with a maximum between 480 nm and 500 nm and having a half-value width of 50 nm to 95 nm,
of a third phosphor having an emission band with a maximum between 450 nm and 460 nm and having a half-value width of 40 nm to 65 nm
0 to 30 weight % of a fourth phosphor having an emission band with a maximum between 610 nm and 630 nm and having a half-value width of 1 nm to 10 nm,
said lamp having an $R_a$ value greater than 90 and a photographic color temperature between 5000K and 6000K.

12. A lamp according to claim 11, wherein said first phosphor is selected from the group consisting of $(Sr,Mg)_3(PO_4)_2$:Sn and $Gd(Zn,Mg)B_{50,0}$:Ce,Mn.

13. A lamp according to claim 12, wherein said first phosphor is present in an amount of 50 to 60 weight % and is $(Sr,Mg)_3(PO_4)$:Sn.

14. A lamp according to claim 13, wherein said second phosphor is present in an amount of 20 to 30 weight % and is $Sr_3AL_{14}O_{25}$.Sn.

15. A lamp according to claim 13, wherein said third phosphor is $(Ba,Sr,Eu)(Mg,Mn)Al_{10}O_{17}$.

16. A lamp according to claim 12, wherein said first phosphor is present in an amount of 20 to 50 weight % and is $Gd(Zn,Mg)B_5O_{10}$:Ce, Mn.

17. A lamp according to claim 16, wherein said second phosphor is present in an amount of 50 to 65 weight % and is $(BaCa)_5(PO_3Cl$:Eu.

18. A lamp according to claim 16, wherein said first phosphor is present in an amount of 1 to 15 weight % and is $(Sr,Mg)_3(PO_4)_2$:Sn.

19. A lamp according to claim 11, wherein the discharge space contains mercury.

20. A lamp according to claim 11, said lamp having an $R_a$ value greater than 94.

21. A lamp according to claim 11, wherein said first phosphor is present in an amount of 50 to 60 weight % and is $(Sr,Mg)_3(PO_4)$:Sn, said second phosphor is present in an amount of 20 to 30 weight % and is $Sr_3AL_{,14}O_{25}$: Sn, said third phosphor is present in an amount of 10 to 30 weight % and is $(Ba,Sr,Eu)(Mg,Mn)Al_{10}O_{17}$.

22. A lamp according to claim 21, wherein said fourth phosphor is substantially omitted from the phosphor blend.

23. A high lumen output compact fluorescent lamp having a luminous efficiency of 40 lumen/W or higher, comprising
an envelope enclosing a discharge space,
means for providing a discharge in the discharge space,
a discharge gas sealed in the discharge space, a fluorescent layer made of a phosphor blend coated on the inner surface of said envelope, the phosphor blend comprising a first phosphor having an emission band with a maximum between 620 nm and 635 nm and having a half-value width of 70 nm to 150 nm, which is a mixture of $Gd(Zn,Mg)B_5O_{10}$:Ce,Mn in an amount of 20 to 50 weight % and $(Sr,Mg)_3(PO_4)_2$:Sn in an amount of 1 to 15 weight %.

a second phosphor having an emission band with a maximum between 480 nm and 500 nm and having a half-value width of 50 nm to 95 nm, which is present in an amount of 50 to 65 weight % and is $(BaCa)_5(PO_4)_{31}$: Eu.

0 to 20 weight % of a third phosphor having an emission band with a maximum between 450 nm and 460 nm and having a half-value width of 40 nm to 65 nm, 0 to 30 weight % of a fourth phosphor having an emission band with a maximum between 610 nm and 630 nm and having a half-value width of 1 nm to 10 nm.

said lamp having an $R_a$ value greater than 90 and a photographic color temperature between 5000K and 6000K.

24. A lamp according to claim 23, wherein said third phosphor and said fourth phosphor are substantially omitted from the phosphor blend.

25. A lamp according to claim 23, said lamp having an $R_a$ value greater than 96 and a photographic color temperature of 5500K.

* * * * *